R. C. A. HOLZHAUSEN.
MIXING VALVE.
APPLICATION FILED SEPT. 14, 1912.

1,083,015.

BEST AVAILABLE COPY

Patented Dec. 30, 1913.
2 SHEETS—SHEET 1.

Witnesses:
Albert Barenklau
George Herrmann

Inventor
Richard C. A. Holzhausen
By his Attorney
Ivan E. A. Königsberg

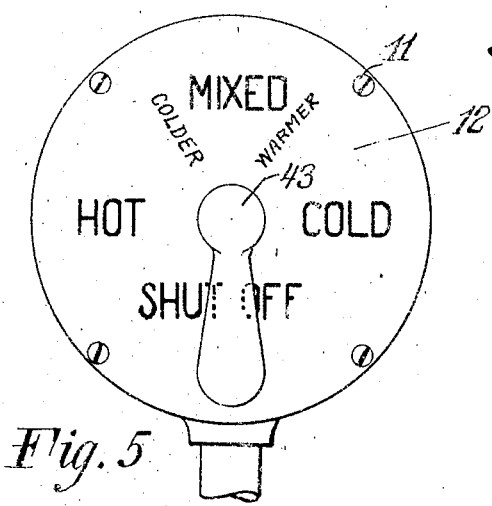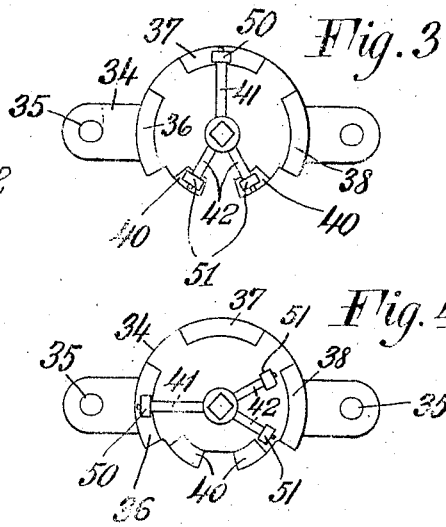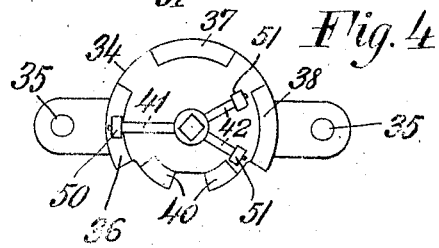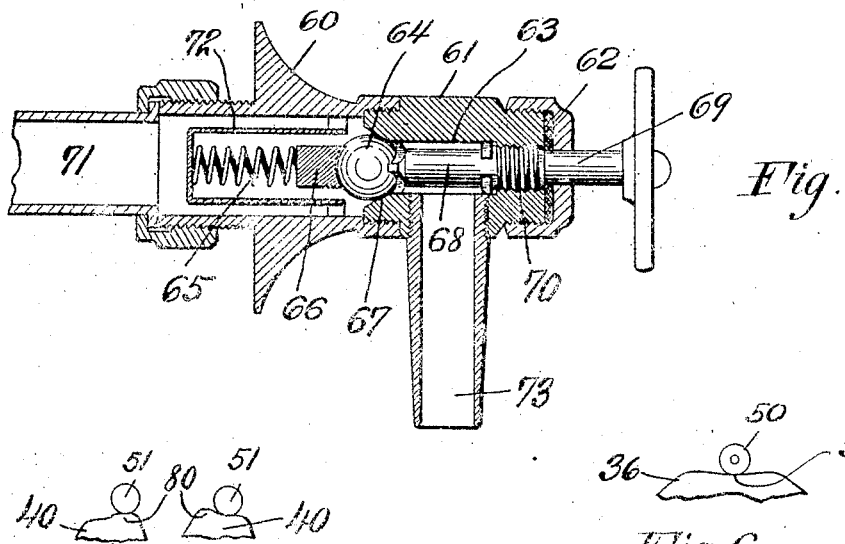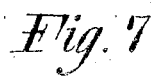

UNITED STATES PATENT OFFICE.

RICHARD C. A. HOLZHAUSEN, OF NEW YORK, N. Y., ASSIGNOR, BY MESNE ASSIGNMENTS, TO HOTAKOLD VALVE CO., INC., A CORPORATION OF NEW YORK.

MIXING-VALVE.

1,083,015.  Specification of Letters Patent.  Patented Dec. 30, 1913.

Application filed September 14, 1912. Serial No. 720,326.

*To all whom it may concern:*

Be it known that I, RICHARD C. A. HOLZHAUSEN, a citizen of the United States of America, and a resident of the borough of Bronx, Westchester county, State of New York, have invented certain new and useful Improvements in Mixing-Valves, of which the following is a specification.

This invention relates to improvements in mixing valves with particular reference to the mixing of hot and cold water for use in bath rooms and similar places. My invention, however, is not limited in its use to the mixing of water, but is usable and may be applied for the mixing of other liquids.

One object of the invention is to provide a mixing valve of simple construction containing several novel features for the safe and sure operation of the various parts with a view of equalizing the wear thereof to increase the life of the valve.

Another object is to eliminate the use of a stuffing box around the operating handle of the valve.

Still another object is to provide a construction embodying balls as the closing elements of the inlet valves which greatly facilitate the automatic closing thereof.

Still other objects of the invention will appear as the specification proceeds.

The invention is illustrated in its preferred form in the accompanying drawings in which—

Figure 1:
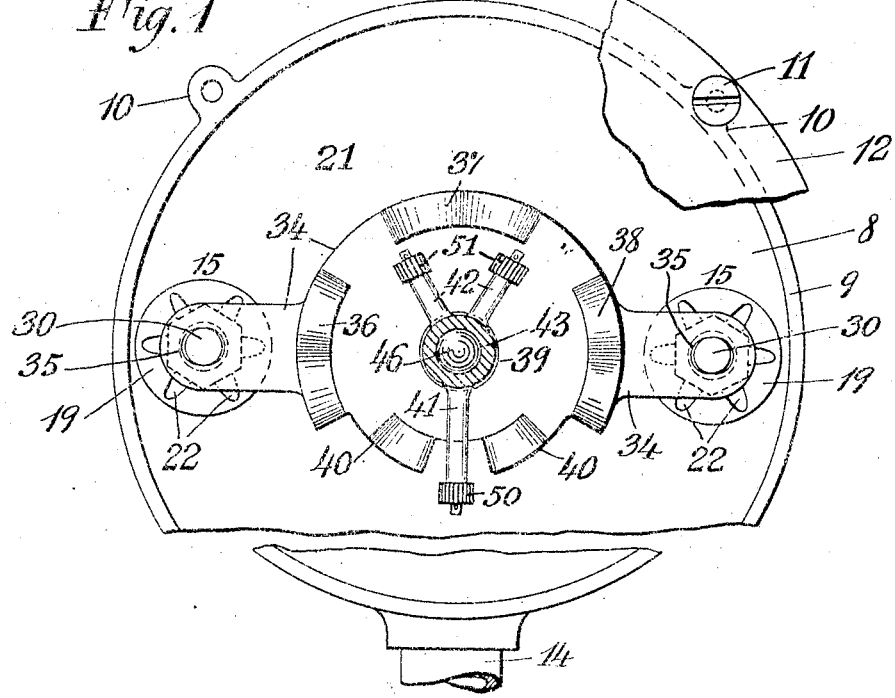
Figure 2:
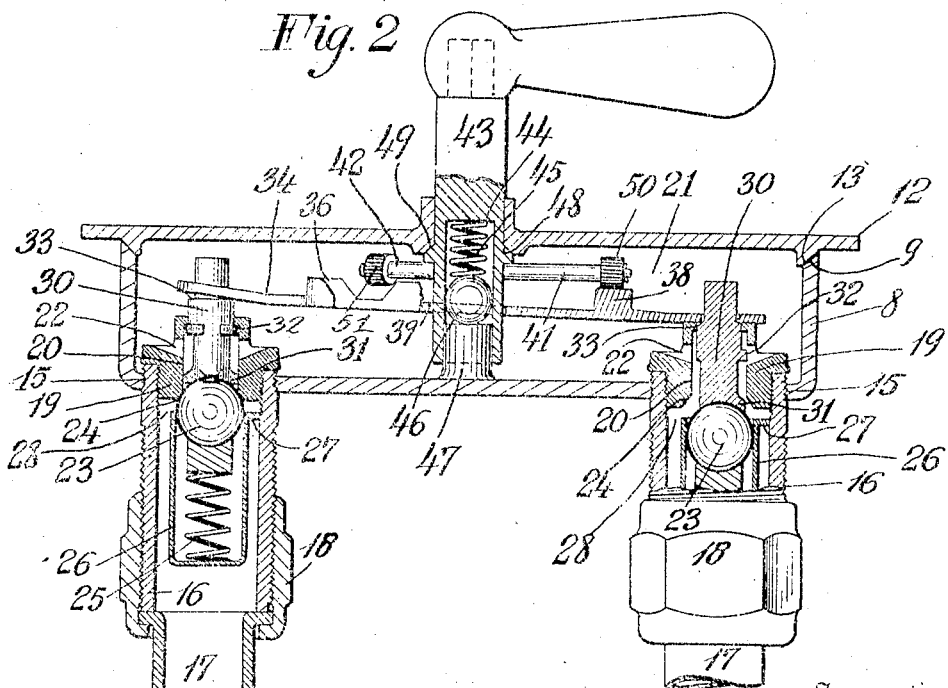

Figure 1 is a plan view with the cover removed and with parts in section and other parts omitted. Fig. 2 is a central transverse sectional view through the valve showing one of the inlet valves open. Figs. 3 and 4 are detail views illustrating the operation of my invention. Fig. 5 is a front elevation of the valve. Figs. 6 and 7 are detail views showing the configuration of the cams, and Fig. 8 shows certain features of my invention embodied in a faucet.

In the drawings the reference numeral 8 represents the valve casing which may be. of any suitable or convenient form. In the present instance I have illustrated the casing as being circular and provided with a seat 9 and lugs 10 for the reception of screws 11 for securing the cover 12. The cover is provided with a depending circular flange forming a seat 13 adapted to engage the aforesaid seat 9 whereby a watertight closure of the valve casing is obtained without the use of a packing. The casing is provided with an outlet 14 and two inlets 15, 15 which receive the inlet valves, of which only one need to be described as they are alike.

16 represents a valve body or sleeve threaded into the inlet openings as shown and to which the inlet pipe 17 is attached by means of a coupling 18.

19 is the valve seat member having the central opening 20 communicating with the mixing chamber 21 within the casing 8 through several smaller openings 22. The valve opening 20 is closed by the ball 23 which rests on the valve seat 24.

25 is a spring contained within a pocket 26 for forcing the ball against the seat 24 to close the valve. The pocket 26 is suitably secured within the sleeve 16 by three or more small lugs 27 at the top only one lug being shown, leaving openings 28 for the flow of the liquid. A follower is interposed between the ball 23 and the spring 25.

30 is a plunger for opening the valve by forcing the ball against the spring 25 and compressing the latter. The plunger is provided with spaced feet 31 which engage the ball and form spaces for the flow of the liquid. It is further provided with stops 32 limiting its upward or outward movement as will be understood.

33 is a shoulder on the plunger 30. On the two shoulders 33 on the two plungers 30 rests the valve actuating member 34 which is provided with slots 35 to permit of play between the member 34 and the plungers 30. The valve actuating member 34 further carries cams 36, 37 and 38 circumferentially disposed around the center aperture 39 and other cams 40, 40, also circumferentially arranged but nearer the center of the member 34.

41 and 42, 42 represent arms of a spider secured to the operating stem 43. The arm 41 and the arms 42 carry cam rolls 50, 51; 51. The operating stem is recessed at 44 to receive a spring 45 and a ball 46 which latter rests on a post 47 in the casing 8. The operating stem is provided with a ground seat 48 which engages a seat 49 on the cover 12. By this construction a watertight closure is obtained between the operating stem and the cover without the use of a packing.

Normally the handle stands in "shut-off" position as shown in Fig. 5 and the spider arms are in a corresponding inactive position as shown in Fig. 1. When it is desired to turn on the cold water, the operating stem is turned into the position illustrated in Fig. 2 where it will be seen that the arm 41 has been turned to cause the cam roll 50 to ride up on the cam 38 which causes the member 34 to be depressed on that side against the shoulder 33 on the plunger 30 which of course opens the valve to let the cold water flow into the chamber 21 and out through the outlet 14. When hot water is wanted the spider is turned into the position shown in Fig. 4 when the cam roll 50 engages cam 36 and the member 34 is depressed oppositely to the position shown in Fig. 2. In both of these cases it will be seen that the cam rolls 51 are inactive in that they move within the circle of the cams 38 and 36.

When mixed water is wanted the spider is turned into the position illustrated in Fig. 3 where it is seen that the cam roll 50 engages cam 37 and the cam rolls 51 engage the cams 40 thus causing an even downward depression of the member 34 to open both inlet valves at once so that both hot and cold water enter the mixing chamber 21 and pass out through the outlet 14.

When it is desired to adjust the temperature of the mixed water, it may be done by turning the handle on the operating stem 43 a little to the right or the left as the case may be. To this end the cams 40 may be formed as shown in Fig. 7 in which it will be seen that they are each provided with a high portion 80 so that if the rolls 51 are turned as shown in Fig. 7, the cam to the left will be depressed more than the right cam, consequently the left side of the actuating member 34 will be depressed more than the right side which will permit the cold water inlet valve to close slightly to decrease the flow, hence the temperature of the mixed water will rise. If the cam rolls 51 are moved a little to the left, the warm water flow will be retarded and the temperature of the mixed water will be lowered.

Suitable directions may be placed on the cover to indicate the operations for tempering the water and as illustrated in Fig. 5.

It will be observed that the principle of operation embodies a valve operating member which is vertically stationary, but provided with means, in this instance cam rolls, for engaging spaced projections or cams on the valve actuating member to cause the latter to be depressed to either the one or the other side, or to cause an even downward depression in order to mix the liquids admitted through the inlet valves, or for the purpose of adjusting the temperature of the mixed water. Again it will be seen, that normally the valves are closed by the combined action of the springs 25 and the pressure of the liquid on the balls 23 and as the member 34 rests on the valve plungers it is kept at its normal level by the pressure which tends to close the valves. One advantage of this construction is a saving in wear on the various parts, particularly on the cam rolls and the actuating member 34, which are disengaged normally. Further, the cams may easily be so shaped as to furnish very little resistance to the engagement of the cams by the cam rolls, thereby preventing sudden blows or shocks to the device. As shown in Fig. 6 the outer cams may be depressed at 55 to provide a natural stopping position for the cam roll and to prevent the latter from leaving the cams of themselves. The cam rolls may also be knurled as shown. I have also found by actual operation that by the construction described, pounding or hammering of the water is eliminated. By the use of a ball to close the valve a certain closure is obtained and the cost of manufacture is kept down.

In Fig. 8, I have shown my invention applied to a faucet. In this instance 60 represents the body, 61 the valve seat member while 62 is a stuffing box. The aperture 63 is closed by a ball 64 under tension by the spring 65. A follower 66 may be provided between the ball and the spring if desired. The ball engages the seat 67. In this instance the plunger 68 is integral with the operating stem 69, but is otherwise constructed as above described. The stem is threaded at 70 into the valve seat member 61. When the stem is screwed inwardly the ball is forced back from its seat and water passes from the supply pipe 71 past the spring pocket 72, through the opening 63, past the plunger 68 and out through the outlet 73. When the stem is screwed outwardly the ball follows the plunger until the spring forces it onto the seat 67 and the valve is closed. This construction avoids the usual trouble with leaky faucets due to worn washers and the like and avoids the well known pounding and irregular flow of the water, because in this instance the solid stream of water is divided as it passes around the pocket member past the ball.

Many details in the construction of my invention may of course be made without departing from the spirit thereof and within the scope of the appended claims.

I claim:—

1. The combination of two valves, a single valve-actuating member supported on the same and means for operating said member to cause either one of the said valves to be opened at will.

2. The combination of two inlet valves, a single valve-actuating member supported on the same, said member being separate and independent from the said valves and means for operating said member to cause either one of said valves or both of the said valves to be operated at will.

3. The combination of two inlet valves, valve plungers for opening the same, a single actuating member supported by said valve plungers and means for operating said member to cause either one of said valves or both of said valves to be opened at will.

4. The combination of two valves, a single valve-actuating member, means on said valves for supporting the said member and mechanism for operating said member to cause either one of said valves to be opened at will or to cause both of said valves to be opened.

5. The combination of two valves, a valve plunger projecting from each of said valves, a single actuating member resting on the said plungers and means for operating said member to cause the same to actuate either one or both of the said plungers to open either one of said valves or both of the said valves.

6. The combination of two valves, a laterally-immovable actuating member supported on the same and means for imparting a rocking or oscillating motion to said actuating member to cause the latter to open either one of the said valves.

7. The combination of two valves, a spider journaled between the same, a valve actuating member supported at opposite ends on said valves and means for operating said spider to depress either end of said actuating member to open the valve supporting said end.

8. The combination of two valves having valve plungers provided with shoulders, a valve actuating member resting at opposite ends on the shoulders of said valve plungers, a cam at each end of said member, a cam roll adapted to engage either of the said two cams and means for revolving said cam roll to cause the same to engage either one of the said two cams to depress the said actuating member for opening either one of the said valves.

9. The combination of two valves, a valve actuating member loosely supported at opposite ends on said valves, cams on said member, a plurality of cam rolls and means for operating the cam rolls to cause one or more of them to engage one or more of said cams to depress either end or the whole of said actuating member to open the one or both of the said valves.

10. The combination with a valve casing, two valves supported in the same, each of said valves comprising a valve body having a valve seat member, a pocket member supported below said valve seat member, a ball, a spring in said pocket for forcing the ball against the valve seat, and a plunger for opening said valve, a single valve-actuating member resting at opposite ends on the two valve plungers and means for depressing either end of said actuating member to open the valve supporting said end.

11. The combination of two valves, a valve actuating member having a central portion provided with cams and two end portions resting on the said valves, a plurality of cam rolls mounted centrally above said actuating member and means for operating said cam rolls to cause them to engage a part of said cams to depress the said actuating member to open both of said valves or to cause only one of said cam rolls to engage either one of two of said cams to rock said actuating member to depress one or the other end portion thereof to open the valve supporting said end.

Signed at New York, N. Y., this 11th day of Septbr. 1912.

RICHARD C. A. HOLZHAUSEN.

Witnesses:
ALBERT BAERENKLAN,
GEORGE HERRMANN.